Aug. 11, 1964

R. ALAJOUANINE 3,144,109

IMPACT WRENCHES

Filed Feb. 5, 1963

INVENTOR.
RÉMI ALAJOUANINE

Amster & Levy
ATTORNEYS

Aug. 11, 1964 R. ALAJOUANINE 3,144,109
IMPACT WRENCHES
Filed Feb. 5, 1963 6 Sheets-Sheet 6

INVENTOR.
RÉMI ALAJOUANINE
Amster & Levy
ATTORNEYS

United States Patent Office 3,144,109
Patented Aug. 11, 1964

3,144,109
IMPACT WRENCHES
Rémi Alajouanine, Clamart, France, assignor to Forges et Ateliers de Meudon, Meudon, France, a societe anonyme
Filed Feb. 5, 1963, Ser. No. 256,444
Claims priority, application France Apr. 27, 1962
7 Claims. (Cl. 192—30.5)

This invention relates in general to portable power tools and more particularly to portable power tools of the assembly type for tightening or loosening nuts, screws or bolts by means of repeated rotary impulses, which tools are commonly called "impact wrenches."

The operation of these power tools is based on the transformation of a driving force supplied as a rule from pneumatic rotary motor of which the revolving rotor, gearing or crankshaft coupled directly to the impact mechanism is suddenly stopped at each revolution exactly when the percussion takes place. This series of discontinuous rotary blows is converted into a sequence of repeated torques much greater than the motor torque actuating the mechanism.

It is a primary object of the invention to provide a very compact impact mechanism. Another object of the invention consists in providing an assembly having a perfect dynamic balance in the radial plane.

This rotary impact wrench designed for tightening or loosening nuts or screws by rotation, and comprising a tool holder to be engaged on the member to be rotated for screwing in or out and provided with a pair of diametrically opposite anvil elements, a hammer carrier having a diametral passage formed therethrough and carrying in the axial direction a shaft rotatably driven from a motor, two hammers mounted for radial sliding movement in said diametral passage of said hammer carrier and formed externally with striking faces adapted to strike simultaneously said pair of anvil elements, and resilient return means constantly urging said elements to a central inoperative position in which their striking faces are retracted with respect to said anvil elements of the tool holder, is characterized in that a locking member rotatably solid with said tool carrier and constantly urged in the axial direction by a spring reacting in said tool carrier toward an operative locking position in which said hammers are locked in said retracted position, has a flat face formed thereon which engages a circular cam face cut in the end portion of said hammer carrier, said circular cam face being shaped to permit the passage of said locking member to its operative hammer-locking position under the resilient force of said spring during slightly more than a half-revolution of said hammer carrier upon each release of said hammers which occurs upon each impact of said striking faces against said anvil elements due to the action of said resilient return means.

With the foregoing and other objects in view, the invention resides in the novel arrangement and combination of parts and in the details of construction hereinafter described and claimed, it being understood that changes in the precise embodiments of the invention herein disclosed may be made within the scope of what is claimed without departing from the spirit of the invention.

Other objects and advantages will become apparent from the following description taken in conjunction with the accompanying drawings, in which.

Figures 1, 2:
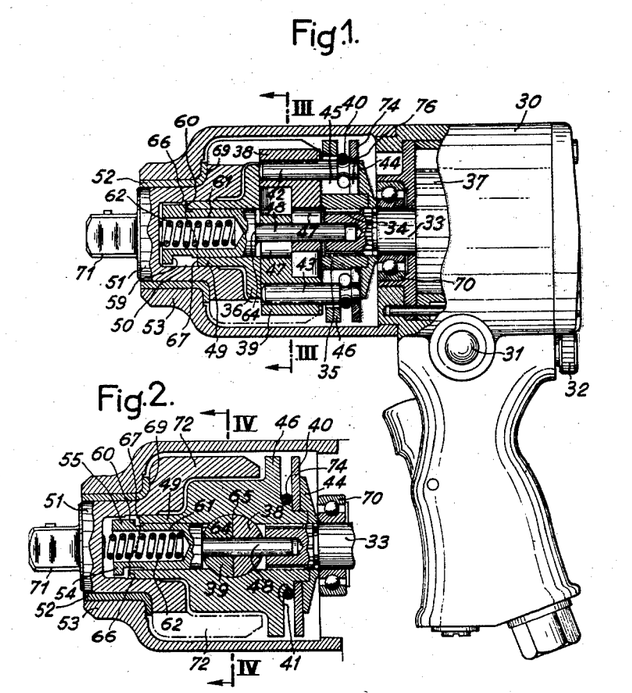
FIGURE 1 is a part-sectional, part-elevational side view showing the impact wrench powered by a blade-type pneumatic motor, only the impact mechanism of the tool being shown in axial section with the hammers in their outermost radial offset position.
FIGURE 2 shows one portion of the mechanism of FIG. 1 with the hammers fully retracted and directed transversely in relation to the plane of the figure.

As shown in FIG. 1, a case 30 encloses a pneumatic motor of which the reversal may be controlled by means of a reversing knob 31. A knurled knob 32 permits of varying at will the motor power output in order to provide a torque proportional to the dimension of the nut or bolt to be tightened. The shaft 33 of the motor-rotor 37 has a splined end portion 34 engaging a correspondingly broached splined bore formed longitudinally in the rear end portion 35 of a hammer carrier 36. This hammer carrier 36 is thus rotatably solid with the motor rotor 37.

Figure 9:
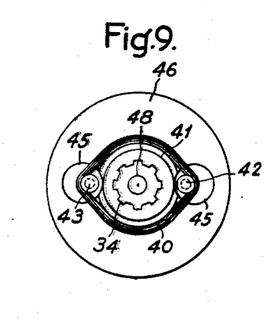
FIGURE 9 is a view from the rear showing the rotary assembly of the impact mechanism shown separately in FIG. 10.
Figures 15, 17:
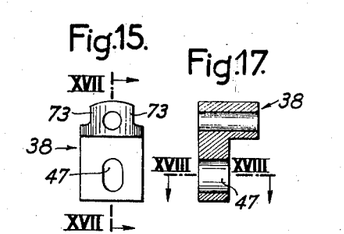
FIGURES 15, 16, 17 and 18 are detail views showing a hammer respectively as in FIGS. 3 to 5, in plane view from above as in FIG. 15, and in sections taken upon the lines XVII—XVII and XVIII—XVIII, respectively.

The impact mechanism comprises essentially two hammers 38, 39 of same mass, mounted in radially and diametrally opposite positions in the hammer carrier 36 and constantly urged toward the axis of rotation by a spring consisting for example, as shown, of a toroidal ring 40 of suitable rubber composition, the inner contour of this ring 40 engaging an outer contour 41 of the hammer carrier 36 (see FIGS. 9 and 10) and the bottom of circular grooves formed in two diametrally opposite pins 42, 43 parallel to the axis of the hammer carrier. The longitudinal displacement of these pins 42, 43 is limited in the forward direction by their domed front ends engaging the inner wall of the hammer carrier bore in which the hammers are slidably fitted, and in the backward direction by an abutment disc 44. A pair of circular apertures 45 (see FIG. 9) formed in the flange 46 of hammer carrier 36 permit the free radial displacement of pins 42, 43, the maximum centrifugal radial stroke of each hammer being limited by the engagement of the bottom of an elongated hole 47 (see FIGS. 15 and 20) with a central pin 48.

Figure 12:
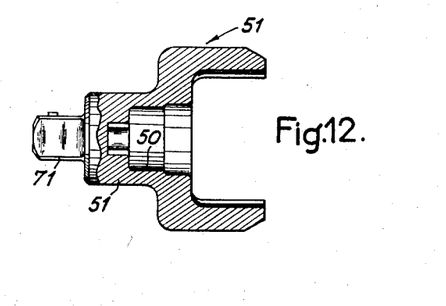
Figure 19:
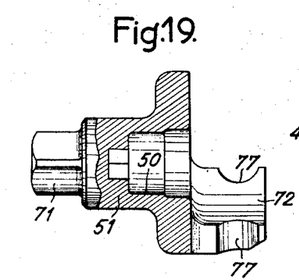
FIGURE 19 shows, like FIG. 2, a modified embodiment of the tool carrier.

The front portion 49 of hammer carrier 36 revolves freely in a bore 50 formed in the tool holder 51 (see FIGS. 12 and 19) mounted in turn for free rotation in a sleeve 52 force-fitted in the front case or cap 53 of the impact mechanism which constitutes the extension of case 30.

Figure 10:
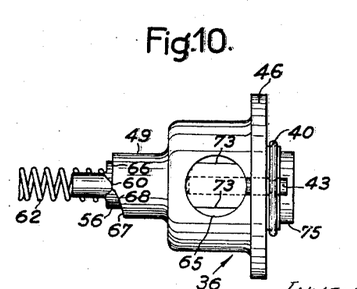
Figure 11:
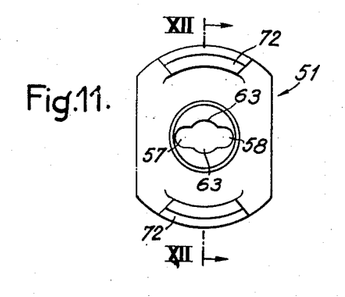
FIGURES 11 and 12 are an elevational view from the rear and an axial section taken along the line XII—XII respectively, showing the tool holder with its anvil elements which, during the operation of the impact wrench, are struck by the striking faces of the hammers.
Figure 13:
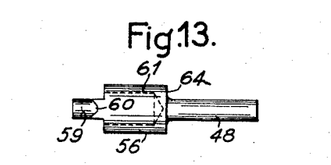
FIGURE 13 is a detail view excerpted from FIG. 1 and showing a central shaft restricting the radial outward displacement of the hammers and locking these hammers in due time through the action of the spring responsive to the rotation of said hammer carrier.
Figure 14:
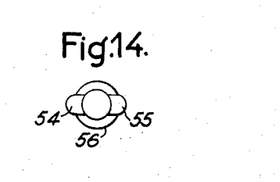
FIGURE 14 is a front elevational view showing the manner in which said central shaft is connected to the tool holder.
Figure 23:
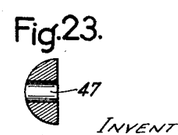

A locking member 48 is rotatably solid with the tool holder 51 through a pair of rounded projections 54, 55 formed on the journal portion 56 (see FIGS. 13 and 14) and engaging freely, to permit an axial sliding movement of this member, recesses 57, 58 formed in the tool holder 51 (see FIG. 11). The height or length of projection 54 is shown by the broken line 59 and the height or length as well as the V-shaped configuration of the other projection 55 is shown by the flat face 60 on top of the V in FIG. 13. Housed in an axial hole 61 of locking member 48 is a compression coil spring 62 reacting against the bottom of this hole 61 and also against the bottom of bore 63 (see FIG. 11) of tool holder 51, the bottom of bore 63 being coplanar with the bottoms of recesses 57, 58. The hammers 38, 39 slide freely in the bore 63 of hammer carrier 36 when the shouldered face 64 of central shaft 48 is spaced from the inner wall of the bore as shown in section in FIG. 1. The relative spacing takes place when the flat face 60 engages the end 66 of the front portion 49 of hammer carrier 36. The two half-portions of hammers 38 and 39 (see FIGS. 18 and 23) are wedged with each other in bore 65 under the influence of the aforesaid spring 62 when the shouldered face 64 bears against the semi-cylindrical portion of hammer 39 as shown in FIG. 2. During the period in which the hammers are thus wedged, plays or gaps are provided to avoid any contact between the flat face 60 and the lower portion 67 of the cam face on the one hand, and between the flat face 59 and the upper portion 66 of the cam face on the other hand (see FIG. 2). The hammer wedging engagement is discontinued when one of the two helical cam faces 68 (see FIG. 10) engages the flat face 60 which causes the shouldered face 64 to move away from the half-portion of hammer 39 (see FIG. 2) to the position shown in FIG. 1. The upper portion 66 extends over about 180° and is connected to the lower portion 67 by two helical cam faces 68 (see FIG. 10) of same pitch but opposite direction. FIG. 10 and the foregoing illustrate clearly how the hammers are wedged only once per revolution of the hammer carrier 36. The tension of spring 62 is calculated to provide a sufficient wedging effect between the hammers 38 and 39 so as to substract them in due time from the influence of the centrifugal force, since an excessive effort might interfere with the frictional engagement between the tool holder 51 and the face 69 of ring 52 and also exert an abnormally high axial stress on the ball-bearing 70 through the abutment disc 44.

Figure 3:
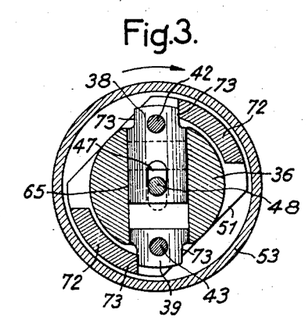
FIGURES 3, 4, 5 and 6 are cross sections taken upon the lines III—III and IV—IV of FIGS. 1 and 2, and showing the impact members in different positions.

If, in the position illustrated in FIG. 3 and through the medium of a tool mounted on the square drive 71 of tool holder 51, a reaction torque locks the anvil elements 72 in the position shown in the drawing, the hammer carrier 36 rotatably solid with the rotor 37 of the pneumatic motor will revolve in the direction shown by the arrow, and thus hammers 38 and 39 being free in their bores 65 will attain their maximum radial offset, under the influence of the centrifugal force, when they are in the impact position with respect to the striking faces of anvil elements 72. From this FIGURE 3 it will be seen that exactly when the blow takes place the whole kinetic energy of the motor rotor 37, hammer carrier 36 and hammers 38 and 39 will produce, through the striking faces 73 of these hammers and on the anvil elements 72, an impact of a force increasing with the angular velocity of the rotary assembly. This angular velocity may be altered by actuating the control knurled knob 32 (see FIG. 1) whereby the compressed air output delivered to the motor may be modified to provide a torque consistent with the size of the bolt, screw or nut to be tightened.

Figure 4:
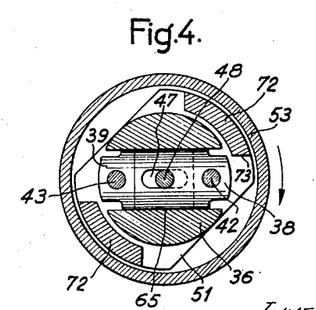
Figure 7:
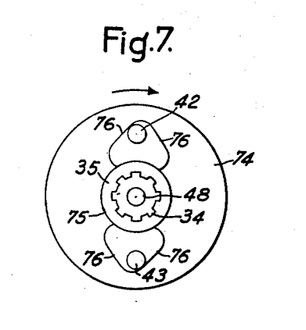
FIGURES 7 and 8 are rear views, that is, taken from the right-hand side of FIG. 1, showing the rotary assembly of the impact mechanism, with the return cams in the position corresponding to that of the hammers illustrated in FIGS. 3 and 4.

To ensure a regular operation of the impact mechanism at the extreme values of the compressed air pressure range from a minimum of, say, 15 p.s.i. to a maximum of, say, 100 p.s.i., the tension of the toroidal rubber ring 40 (see FIG. 9) should apply to the return pins 42, 43 a force inferior to that exerted by the lowest centrifugal force when the pressure of the compressed air supplied to the pneumatic motor is about 15 p.s.i., so that the hammers 38 and 39 may attain their maximum radial offset position at the impact time (see FIG. 3). Immediately after this impact has occurred the angular velocity and the centrifugal force cancel each other, but the motor or drive torque continues to urge the striking faces 73 of the hammers against the anvil elements 72 with a force proportional to the motor air feed pressure. The effort exerted on the return pins 42, 43 by the rubber ring 40 is not sufficient to overcome the frictional contact produced by the motor torque urging the faces in relative contact if the air pressure exceeds 15 p.s.i. A return disc 74 shown in FIG. 7 exactly when the impact takes place (FIG. 3) has the same angular velocity as the hammer carrier and pivots by inertia in the direction of the arrow on the rear journal portion 75 of hammer carrier 36, the inclined sides 76 of the openings formed in this disc acting as cam faces by sliding on the end portions of the return pins 42, 43, whereby the radial efforts resulting therefrom add themselves to the return force exerted by the rubber ring 40. The hammers 38 and 39 are thus moved away from the anvil elements 72 and when they have retracted completely the motor torque accelerates again the rotation of the assembly and in the position illustrated in the sectional view FIG. 4 the flat face 60 of central pin 48 begins to move away from the upper portion 66 of hammer carrier 36 (see FIG. 10) and the hammers 38 and 39 are locked by the spring 62 when the shouldered face 64 of central pin 48 engages the front portion of hammer 39.

Figure 8:
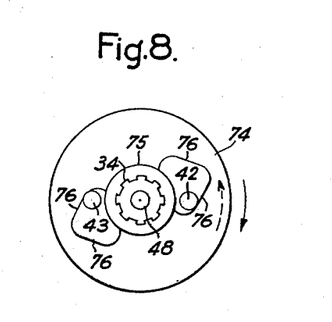

FIG. 8 corresponds to FIG. 1 as far as the hammer position is concerned. It clearly shows the position of the return disc 74 during the acceleration of the assembly in the direction of the arrow. This disc, by inertia, reacts in the direction opposite to the direction of rotation (which is indicated by the arrow in broken lines) and the inclined sides 76 generate on the return pins 42, 43 a radial force directed toward the axis, this force adding itself to the friction produced by the bearing face 64 with the assistance of spring 62 for counteracting the action of the centrifugal force.

Figure 5:
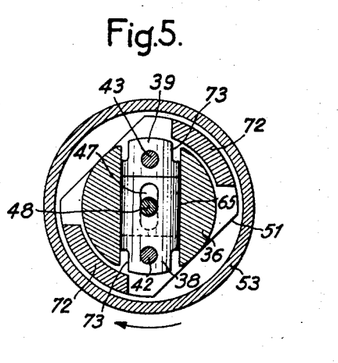

The hammer thus stopped in their bores 65 are in the position shown in the sectional view of FIG. 5, the striking faces 73 being prevented from engaging the anvil elements 72.

Figure 6:
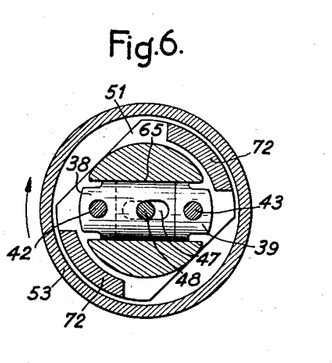

In the hammer position illustrated in FIG. 6, the flat face 60 engaged by the helical cam faces 68 (FIG. 10) releases the two hammers which are thus responsive to the centrifugal force (stronger than the return force exerted by ring 40 on pins 42 and 43) and move rapidly to their outermost radial offset position as shown in the sectional view of FIG. 3. Thus the striking faces 73 engage the anvil elements 72 and produce at the impact time a shock with a strength increasing with the angular velocity of the rotary assembly. This angular velocity is subordinate to the motor power which is adjustable by means of the knurled control knob 32.

Figures 16, 18, 20, 22:
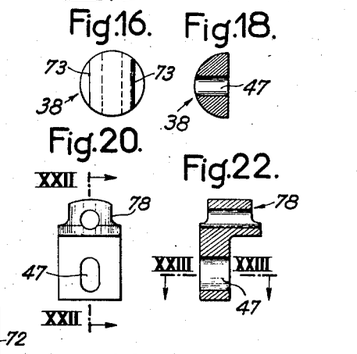
FIGURES 20, 21, 22 and 23 show like FIGS. 15 to 18 respectively, a hammer designed for co-operating with the modified tool holder of FIG. 19.
Figure 21:
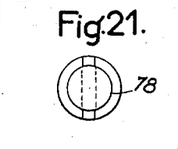

The parallel striking faces 73 of the hammers (see FIG. 16) may be cylindrical as shown at 78 in FIGS. 20 and 21. In this case the anvil elements 72 of the tool holder, in the modified embodiment illustrated in FIG. 19, consist of notches 77 of cylindrical configuration corresponding to that of the striking faces of the hammers.

From the above disclosure it appears that the hammers can be released only once per revolution of the impact mechanism (the reaction torque of the bolt or nut to be tightened being assumed to be rather high so that the anvil elements are nearly completely motionless), thus causing only one blow to be produced per revolution of the motor and therefore of the hammer carrier.

In the alternate embodiment illustrated in FIGS. 24 to 43 of the drawings the arrangement is substantially the same as far as the case, the motor rotor and the rotor shaft with the splined portion engaging the rear portion of a hammer carrier, are concerned. These component elements as well as the hammers, the toroidal rubber ring, the hammer pins, the hammer-carrier disc and its apertures, the front portion of the hammer carrier, the tool holder, the tool-holder bore, the case enclosing the impact mechanism and the ring fitted in this case are designated by the same reference numerals as in the preceding form of embodiment described with reference to FIGS. 1 to 23 of the drawings.

In this alternate embodiment however, the permissible radial stroke of pins 42 and 43 and therefore of the hammers themselves is limited between two end positions resulting from the abutment of these pins against the opposite edges of openings 45 formed in the flange 46 of hammer carrier 36.

In this specific embodiment the locking member comprises two elements 48a and 48b moving bodily with each other in the axial direction but free to rotate in relation to each other. The first element 48a is rotatably solid with the hammers 38 and 39 and therefore with the hammer carrier 36, and the other element 48b is rotatably solid with the tool carrier 51. This other element 48b is a sliding member rotatably solid with the tool holder 51 due to the provision of a pair of rounded extensions 163, 164 projecting beyond the journal portion 165 and engaging freely (to permit the axial movement) the recesses 166 and 167 of tool holder 51 (see FIG. 31). The height of extension 164 is shown by the broken line 168 of FIG. 37 and the height as well as the rounded, V-shaped configuration of extension 163 is shown at 169. Housed in an axial hole 61 is a coil compression spring 62 reacting against the bottom of hole 61 and against the bottom of the tool-holder bore 172 (see FIGS. 31 and 32). From FIGS. 24 and 25 it appears clearly that the locking element 48b engaging the elongated holes 174 of the hammers (see FIG. 33) is rotatably carried along with the revolving tool-carrier assembly and slides freely at the front on the cylindrical journal portion 175 engaging the hammer-carrier bore, and at the rear on the cylindrical journal portion 176 of the rotor front portion 33. The sliding element 48b is connected to the locking element 48a by means of a shoulder 177 and a groove 178 formed in this element 48a (see FIGS. 42 and 43) engaging half-bores 79 and 80 formed in the sliding element 48b (see FIGS. 39 and 40) whereby these elements are free to rotate relative to, but remain axially solid with, each other.

Figure 24:
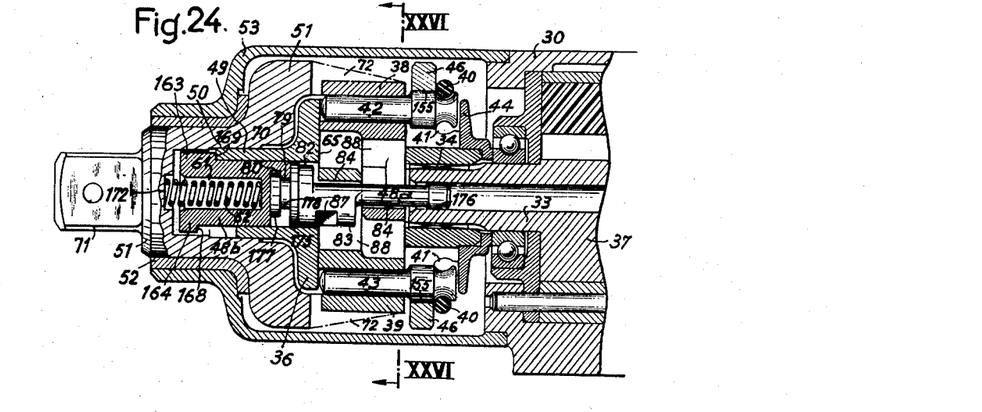
FIGURE 24 is a section showing a modified embodiment of one portion of the complete impact wrench powered by a blade-type pneumatic motor, the impact mechanism of the device being shown in axial section with the hammers in their outermost radial offset position.

In FIG. 24 the hammers 38 and 39 are shown as being adapted to slide freely in the bore 65 of the hammer carrier (see FIG. 25) when the rounded edges 82 and 83 of element 48a are disengaged from the bottoms of the elongated holes or slots 84 (see FIG. 33) which are common to each hammer and diametrally opposite. This disengagement occurs when the rounded portion 169 of sliding element 48b (see FIG. 37) bears on the upper portion 85 of the cam face formed at the front end 49 of hammer carrier 36 (see FIG. 29).

Figure 25:
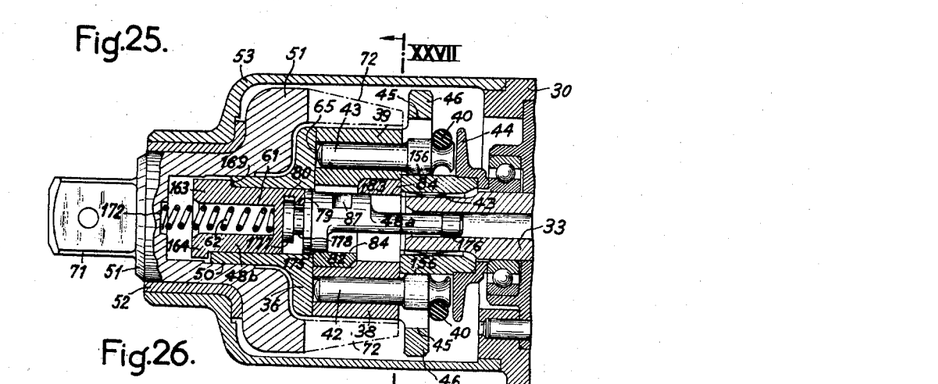
FIGURE 25 shows the impact mechanism with the hammers in their fully retracted and locked position.

FIGURE 25 illustrates on the other hand the hammers locked in their fully retracted position when the rounded edge 169, as a consequence of the action of spring 62 and due to the rotation of the hammer carrier, engages the lower portion 86 of said cam face (see FIG. 29), the rounded edges 82 and 83 of element 48a engaging the slots 174 of each hammer, and when the centrifugal force becomes preponderant to overcome the elastic return force exerted by the rubber ring 40, the bottoms of slots 84 common to each hammer engage the rounded edges 82 and 83, thus holding the hammers against motion in this position until the rounded edges 82 and 83 are released from the bottoms of slots 84.

To avoid the wrong mounting of the lock member in the elongated holes or slots 174 of hammers 38 and 39, the element 48a carries a boss 87 projecting on either side of the flat face (see FIGS. 41, 42 and 43), so that when assembling the parts these projecting bosses can penetrate only through the elongated hole 88 of larger dimension than the lower hole 174 with its bottom 84.

FIG. 24 shows that when the hammers are in their outermost radial offset position, the elongated holes 88 extend to points 89 and 90 (see (FIG. 35) to permit the free passage of bosses 87 in the hammer 39. The elongated hole 88 is also formed in hammer 38 for the sake of symmetry, but FIGS. 24 and 25 show that this hole is not necessary in the case of hammer 38. As the hammers 38 and 39 have the same shape, the hammer 38 may be replaced by hammer 39 without any inconvenience.

Figure 29:
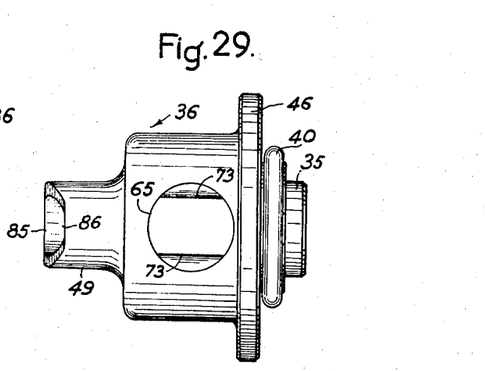
Figures 30, 31:
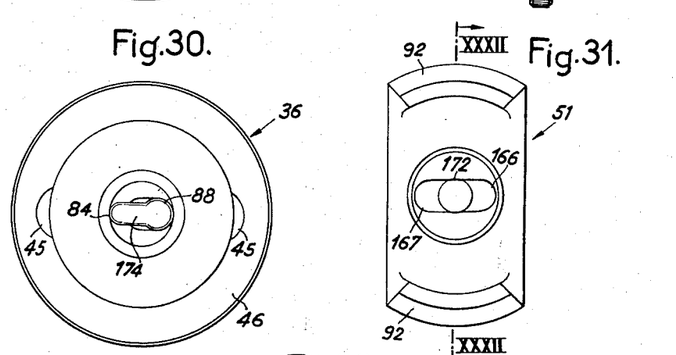
FIGURES 31 and 32 show the tool holder with the anvil elements which are struck by the hammers, respectively in rear view and in axial section taken along the line XXXII—XXXII of FIG. 31.
Figure 32:
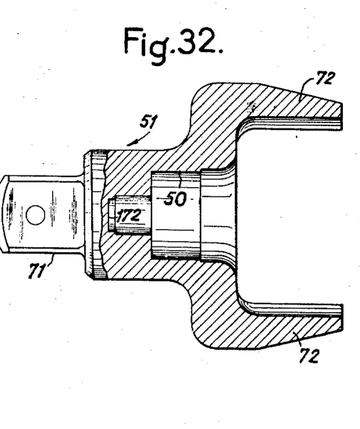
Figures 33, 34, 35, 36:
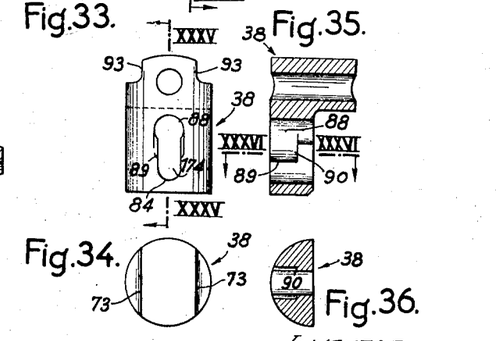
FIGURES 33, 34, 35 and 36 illustrate a hammer respectively as in FIG. 26 in plane view from above as seen in FIG. 33 and in sections taken upon the lines XXXV—XXXV and XXXVI—XXXVI respectively.
Figure 37:
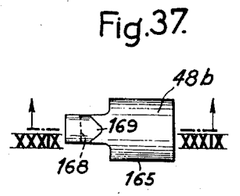
FIGURES 37, 38, 39 and 40 are respectively a side elevational view, a front elevational view and sections taken upon the lines XXXIX—XXXIX and XL—XL respectively, of a sliding member rotatably solid with the tool carrier and controlling the axial displacement of the locking member through the action of a spring responsive to the rotation of the hammer carrier.
Figure 38:
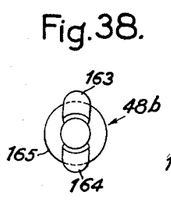
Figure 39:
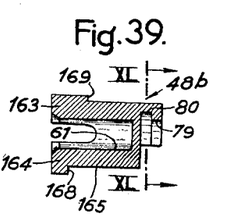
Figures 40, 41:
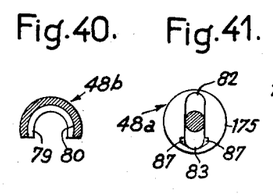
FIGURES 41, 42 and 43 are views taken as per FIGS. 42 and 43 and section XLI—XLI respectively, showing details of the locking mechanism controlled in the axial direction by the sliding member and adapted positively to lock the hammers in due time in their fully retracted position.
Figure 42:
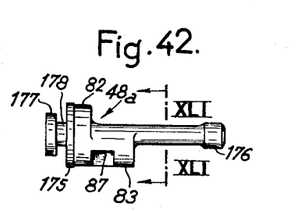
Figure 43:
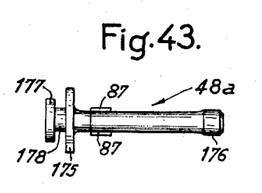

The upper portion 85 of the cam face (see FIG. 29) extends over about 180° and merges into the lower portion 86 along two helical ramps or cam faces of same pitch but opposite directions. FIG. 29 and the foregoing show clearly that the hammers are locked only once per revolution of the power unit 37 and hammer carrier 36.

Figure 26:
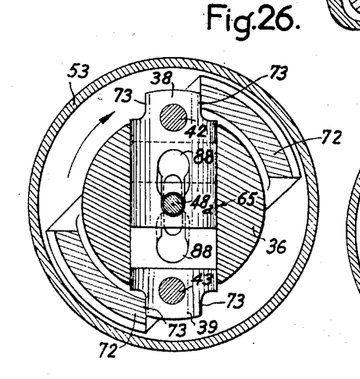
FIGURES 26 and 27 are cross sections taken upon the lines XXVI—XXVI and XVII—XVII respectively, with the hammers in their outermost radial offset position and in their fully retracted position respectively.

If in the position illustrated in FIG. 26 and with the assistance of a tool (such as a socket wrench) mounted on the drive square 71 of tool holder 51, a reaction torque locks the anvil elements 72 in the position shown in the drawing, the hammer carrier 36 rotatably coupled with the motor rotor 37 revolves in the direction of the arrow, the hammers 38 and 39 being free in their bore 65 are responsive to the centrifugal force and attain their outermost radial offset position when they are in the impact position with respect to the striking faces of anvil elements 72. From this figure it appears clearly that when the impact takes place the whole kinetic energy of the motor-rotor 37, hammer carrier 36 and hammers 38, 39 produce through the striking faces 73 of the hammers and on the anvil elements 72 a blow, and the higher the angular velocity of the revolving assembly, the stronger the blow.

To obtain a regular operation of the impart mechanism with an air feed pressure range lying within the limit of about 15 to 100 p.s.i., the toroidal rubber ring 40 (see FIG. 28) should exert on the pins 42 and 43 an effort lower than that exerted by the lowest centrifugal force when the air feed pressure delivered to the motor is about 15 p.s.i., so that the hammers may attain their outermost radial offset position exactly when the impact occurs (see FIG. 26). Immediately after the blow the angular velocity and the centrifugal force compensate each other but the motor torque continues to press the striking faces 73 against the anvil elements 72 with a force substantially portional to the air feed pressure delivered to the motor.

The effort exerted on the pins 42 and 43 by the rubber ring 40 for returning the hammers to their central postion should be sufficient to overcome the frictional resistance developing between the striking faces 73 and the anvil elements 72, on the one hand, and between the hammers and the walls of bore 65 in which they are slidably engaged, on the other hand, when the motor torque attains a maximum value with a compressed-air supply exceeding for example 100 p.s.i.

Figure 27:
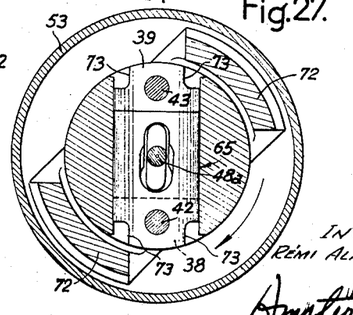
Figure 28:
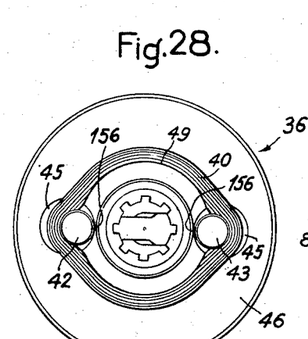
FIGURE 28 is an elevational view from the rear showing the rotary assembly of the impact mechanism illustrated in FIG. 29, the front view of this assembly being shown in FIG. 30.

The hammers 38 and 39 are thus disengaged from the anvil elements 72 and when they are fully retracted the motor torque accelerates again the rotation of the assembly and as illustrated in the sectional view of FIG. 27, that is, after a half-revolution with respect to the position shown in FIG. 26, the rounded edge 169 of sliding element 48b as a consequence of the rotation of the hammer carrier and due to the resilient pressure exerted by the coil spring 62 engages the lower portion 86 of the cam (see FIG. 29), with the rounded edges 82 and 83 of element 48a (see FIG. 42) engaged in the elongated holes 174 of each hammer as illustrated in the sectional view of FIG. 25, these rounded edges 82 and 83 contacting the bottom of the elongated hole 84 of each hammer (see FIG. 33) when the centrifugal force exceeds the resilient return force produced by the rubber ring acting upon the pins 42 and 43.

With the hammers thus locked in their bore 65, their position is that shown in FIG. 27, in which the striking faces 73 do not engage the anvil elements 72. After an angular displacement of about 90° (not shown in the drawing) in relation to the position shown in FIG. 27, the rounded edge 169 of sliding element 48b engages again the upper portion 85 of the cam face and the rounded edges 82 and 83 of element 48a are spaced from the bottoms of the elongated holes 84 of each hammer and occupy the position shown in the sectional view, FIG. 24. As the hammers 38 and 39 are free, these members are thrown outwardly by the increasing centrifugal force and their outermost radial offset position is attained when the shouldered portion of pins 42 and 43 engages the inner face of openings 54 at 155 (see FIG. 24). The angular velocity of the rotary assembly continues to increase until the striking faces 73 engage the anvil elements 72 as shown in FIG. 26, thus producing at the impact time a blow which is as stronger as the angular velocity of the rotary assembly is higher. This velocity depends on the motor power output which, as already explained, is adjustable by means of the the knurled control knob (not shown in the drawings) acting upon an air output limiter.

The foregoing shows clearly that the hammers can be released only once per revolution of the impact mechanism (the reaction torque exerted by the bolt or nut to be tightened being assumed to be relatively high to admit a nearly complete fixity of the anvil elements), thus causing only one blow per revolution of the motor and therefore of the hammer carrier.

To facilitate the return movement of the hammers toward the center exactly when the impact takes place under conditions of operations obtaining with relatively high motor torques (i.e., with an air feed pressure exceeding, say, 85 p.s.i.) the striking faces of the hammers (drawn in a parallel position in the drawing) may be slightly inclined as well as those of the anvil elements, so that when the blow occurs the striking faces in relative engagement develop a centripetal component force on each hammer which adds itself to the return force of spring 62 of rubber ring 40.

Of course, the forms of embodiment described herein are given by way of example only and anybody conversant with the art will readily understand, from the foregoing, that the invention should not be construed as being limited by these specific forms of embodiment since many modifications and alterations may be brought thereto without departing from the spirit and scope of the invention as set forth in the appended claims.

What I claim is:

1. A wrench of the impact type for tightening or releasing by rotation screws or nuts comprising a tool holder mounted for free rotation and having a front end shaped to engage the socket of the screw or nut to be rotated for screwing or unscrewing and a pair of diametrally opposite anvil elements, a hammer carrier mounted behind the rear end of said tool holder and between said anvil elements of said tool holder, said hammer carrier having formed therethrough a diametral passage and being formed with a rear end portion constituting a drive shaft, a pair of hammers mounted for radial sliding movement in said diametral passage of said hammer carrier and formed externally with two striking faces adapted to strike simultaneously said two anvil elements during one revolution of said hammer carrier, a power shaft rigidly connected to said drive shaft of said hammer carrier for rotatably driving said hammer carrier, resilient return means constantly urging said hammers to a central released position in which their striking faces are retracted in relation to said anvil elements of said tool holder, and locking means mounted in said hammer carrier and co-acting with said tool holder for keeping said hammers in their released position against the centrifugal force during more than a half-revolution of said hammer carrier subsequent to the retraction of said hammers by said resilient means after each blow struck by said striking faces of said hammers on said anvil elements of said tool holder.

2. A wrench of the impact type for tightening or releasing by rotation screws or nuts, comprising a tool holder having a recess formed therein, mounted for free rotation and having a front end shaped to engage the socket of the screw or nut to be rotated for screwing or unscrewing, and a pair of diametrally opposite anvil elements, a hammer carrier mounted behind the rear end of said tool holder, and between said anvil elements of said tool holder, said hammer carrier having formed therethrough a diametral passage and comprising a rear end portion constituting a drive shaft, a pair of hammers mounted for radial sliding movement in said diametral passage of said hammer carrier and formed externally with two striking faces adapted to strike simultaneously said two anvil elements during one revolution of said hammer carrier, a power shaft rigidly connected to said drive shaft of said hammer carrier for rotatably driving said hammer carrier, resilient return means constantly urging said hammers to a central released position in which their striking faces are retracted in relation to said anvil elements of said tool holder, a locking member extending axially through said hammer carrier, spring means reacting against the bottom of said recess formed in said tool holder and urging said locking member axially to an operative position to lock said hammers in their central released position, a circular cam face formed on the front end of said hammer carrier, a flat face formed on said locking member and urged by said spring means for engagement with said cam face and co-acting with said cam face to enable said locking member to assume its operative position to lock said hammers under the influence of said spring means during slightly more than a half-revolution of said hammer carrier each time said hammers are released subsequent to each blow struck by said hammer striking faces under the influence of said resilient return means.

3. Impact wrench as set forth in claim 2, comprising in addition a knurled control knob for adjusting the velocity of rotation of said power shaft.

4. A wrench of the impact type for tightening or releasing by rotation screws or nuts, comprising a tool holder mounted for free rotation and having a front end shaped to engage the socket of the screw or nut to be rotated for screwing or unscrewing and a pair of diametrally opposite anvil elements, a hammer carrier mounted behind the rear end of said tool holder and between said anvil elements of said tool holder, said hammer carrier having formed therethrough a diametral passage and comprising a rear end portion constituting a drive shaft, a pair of hammers mounted for radial sliding movement in said diametral passage of said hammer carrier and formed externally with two striking faces adapted to strike simultaneously said two anvil elements during one revolution of said hammer carrier, a power shaft rigidly connected to said drive shaft of said hammer carrier for rotatably driving said hammer carrier, resilient return means constantly urging said hammers to a central released position in which their striking faces are retracted in relation to said anvil elements of said tool holder, a locking member mounted for axial sliding movement in said tool holder and in said hammer carrier, and having a front portion shaped for causing said locking member to rotate bodily with said tool holder and for engaging a cam face formed on the front end of said hammer carriers, and a rear portion having a relatively large shoulder face registering with said pair of hammers and a coil compression spring housed in said tool holder and adapted to react against said tool holder and to urge said locking member to its operative position wherein its front portion engages said cam face of said hammer carrier to impart to said locking member axial movements in synchronism with the rotation of said hammer carrier in relation to said tool holder, whereby during said synchronous axial movements, said locking member locks said pair of hammers in their released position by urging said hammers against each other during more than a half-revolution of said hammer carrier subsequent to each return movement of said hammers which is caused by said resilient return means after each blow struck by said striking faces of said hammers against said anvil elements of said tool holder.

5. A wrench of the impact type for tightening or releasing by rotation screws or nuts, comprising a tool holder mounted for free rotation and having a front end shaped to engage the socket of the screw or nut to be rotated for screwing or unscrewing and a pair of diametrally opposite anvil elements, a hammer carrier mounted behind the rear end of said tool holder and between said anvil elements of said tool holder, said hammer carrier having formed therethrough a diametral passage and comprising a rear end portion constituting a drive shaft, a pair of hammers mounted for radial sliding movement in said diametral passage of said hammer carrier and formed externally with two striking faces adapted to strike simultaneously said two anvil elements during one revolution of said hammer carrier, a power shaft rigidly connected to said drive shaft of said hammer carrier for rotatably driving said hammer carrier, resilient return means constantly urging said hammers to a central released position in which their striking faces are retracted in relation to said anvil elements of said tool holder, complementary means for urging said hammers toward said anvil elements of said tool holder with a force proportional to the velocity of rotation of said hammer carrier, and locking means mounted in said hammer carrier and adapted to co-act with said tool holder to keep said hammers in their released position against the centrifugal force during slightly more than a half-revolution of said hammer carrier subsequent to the return movement of said hammers which is caused by said resilient means after each blow struck by said striking faces of said hammers against said anvil elements of said tool holder.

6. A wrench of the impact type for tightening or releasing by rotation screws or nuts, comprising a tool holder mounted for free rotation and having a front end shaped to engage the socket of the screw or nut to be rotated for screwing or unscrewing and a pair of diametrally opposite anvil elements, a hammer carrier mounted behind the rear end of said tool holder and between said anvil elements of said tool holder, said hammer carrier having a diametral passage formed therethrough and comprising a rear end portion constituting a drive shaft, a pair of hammers mounted for radial sliding movement in said diametral passage of said hammer carrier and formed externally with two striking faces adapted to strike simultaneously said anvil elements during one revolution of said hammer carrier, a power shaft rigidly connected to said drive shaft of said hammer carrier for rotatably driving said hammer carrier, a pair of pins each extending through one of said hammers and having each a circular groove formed around their rear end portion, a resilient return rubber ring engaging said hammer carrier and said circular grooves of said pins to urge said hammers to a central released position in which their striking faces are retracted in relation to said anvil elements of said tool holder, a return disc rotatably mounted on said hammer carrier behind said rubber ring and having two diametrally opposite apertures formed therethrough, each one of said diametrally opposite apertures receiving therethrough the rear end portion of one of said pins and having a cam-like contour co-acting with the relevant pin through the medium of the inertia of said return disc in the direction to return said hammers to their central position each time a blow struck by said striking faces of said hammers stops the rotational motion of said hammers and said hammer carrier, and locking means mounted in said hammer carrier and co-acting with said tool holder for keeping said hammers in their released position against the centrifugal force during more than a half-revolution of said hammer carrier subsequent to the return of said hammers which is caused by each blow struck by said striking faces of said hammers against said anvil elements of said tool holder.

7. A wrench of the impact type for tightening or releasing by rotation screws or nuts, comprising a tool holder mounted for free rotation and having a front end shaped to engage the socket of the screw or nut to be rotated for screwing or unscrewing and a pair of diametrally opposite anvil elements, a hammer carrier mounted behind the rear end of said tool holder and between said anvil elements of said tool holder, said hammer carrier having formed therethrough a diametral passage and comprising a disc-shaped rear portion formed with two diametrally opposite circular apertures and with a rear end portion constituting a drive shaft, a pair of hammers mounted for radial sliding movement in said diametral passage of said hammer carrier and having each a diametral slot cut therein and formed externally with a pair of striking faces adapted to strike simultaneously said anvil elements during one revolution of said hammer carrier, a pair of pins each extending without play through one of said hammers and having a rear end portion extending through one of said two circular apertures formed through said disc in the rear portion of said hammer carrier, said rear end portion of each pin having formed therein a circular groove in a plane spaced from and behind said disc, a resilient return rubber ring engaging the outer surface of said driving shaft of said hammer carrier and said circular grooves of said pins to urge said hammers to a central released position in which their striking faces are retracted relative to said anvil elements of said tool holder, a locking member having a cylindrical journal-forming front portion and another cylindrical journal-forming rear portion, said journal portions being in sliding engagement at the front and at the rear of said hammers in said hammer carrier and in said hammer-carrier driving shaft respectively, said locking member having a pair of diametrally opposite radial locking extensions disposed between said two journal portions and extending one forwards and the other backwards, said locking member being adapted to be set in a forward release inoperative position in which said front radial extension is released in front of said two hammers while said rear radial extension engages the diametral slot of one hammer to permit the radial movements of the relevant hammer, said radial movements being also permitted to the other hammer not engaged by any radial extension, said locking member being also adapted, when said pair of hammers are retracted to their central position, to assume an operative position in which it is urged backwards and wherein said front radial extension engages the diametral slot of said one hammer while said rear radial extension engages the radial slot of said other hammer, thus locking said two hammers in their released position relative to said anvil elements, a sliding member mounted for free rotation and axial sliding movement in said hammer carrier in front of said locking member, said sliding member being adapted to move bodily in the axial direction with said locking member and to revolve bodily with said tool holder, and having a cam face formed thereon, said hammer carrier being formed with a corresponding cam face registering with said cam face of said sliding member, a spring housed in said tool holder and reacting against said tool holder for constantly urging said locking member to its operative position to keep said cam faces of said sliding member and hammer carrier in relative engagement and thus impart to said locking member axial movements in synchronism with the rotation of said hammer carrier in relation to said tool holder and during which axial movements said locking member keeps said two hammers in their released central position during more than one revolution of said hammer carrier subsequent to each return movement of said hammers which is caused by said resilient return means each time said striking faces cause said hammers to strike said anvil elements of said tool holder.

References Cited in the file of this patent
UNITED STATES PATENTS

| | | |
|---|---|---|
| 2,425,793 | Fosnot | Aug. 19, 1947 |
| 2,947,283 | Roggenburk | Aug. 2, 1960 |